United States Patent [19]

Pall

[11] 4,033,881

[45] July 5, 1977

[54] MULTILAYER PAPER SHEET FILTER CARTRIDGES

[75] Inventor: David B. Pall, Roslyn Estates, N.Y.

[73] Assignee: Pall Corporation, Glen Cove, N.Y.

[22] Filed: Jan. 12, 1976

[21] Appl. No.: 648,553

Related U.S. Application Data

[63] Continuation-in-part of Ser. No. 538,972, Jan. 6, 1975, abandoned.

[52] U.S. Cl. .................. 210/491; 210/493 B; 210/497 R; 210/505
[51] Int. Cl.² ...................................... B01D 39/18
[58] Field of Search .......... 55/487, 497, 498, 521; 210/494, 489, 490, 491, 492, 493 B, 497, 505, 508

[56] References Cited

UNITED STATES PATENTS

| | | | |
|---|---|---|---|
| 3,246,767 | 4/1966 | Pall et al. | 210/505 |
| 3,334,753 | 8/1967 | Royer et al. | 210/493 |
| 3,505,794 | 4/1970 | Nutter et al. | 55/487 |
| 3,570,675 | 3/1971 | Pall et al. | 210/490 |
| 3,573,158 | 3/1971 | Pall et al. | 210/505 |
| 3,592,767 | 7/1971 | Pall | 210/490 |
| 3,867,294 | 2/1975 | Pall et al. | 210/492 |

*Primary Examiner*—Thomas G. Wyse
*Assistant Examiner*—Robert H. Spitzer

[57] ABSTRACT

Filter tubes or cartridges are provided comprising a plurality of paper filter sheets of differing pore size, arranged in sequence of fluid flow therethrough according to decreasing pore size, and formed in a concentric corrugated tubular configuration, with at least one foraminous relatively rigid support externally of the outermost and/or internally of the innermost sheet member of the filter tube, in corrugated supporting juxtaposition thereto.

8 Claims, 3 Drawing Figures

MULTILAYER PAPER SHEET FILTER CARTRIDGES

This application is a continuation-in-part of Ser. No. 538,972, filed Jan. 6, 1975, and now abandoned.

Filter cartridges composed of tubular paper filter sheets with the ends of the tube closed off by end caps are widely used for the filtration of lubricating and hydraulic oils, fuels, air, water, and a variety of other fluids. Paper filter sheets are, however, rather weak, and incapable of withstanding high differential fluid pressures thereacross without rupture, so that the art has had recourse to a variety of expedients, to overcome this difficulty.

One way is to impregnate the filter sheet with a resin, which helps to bond the fibers together, and greatly increases strength and rigidity. Thus, resin-bonded filter cartridges have been laid down directly in tubular form from a liquid suspension containing resin and cellulose fibers. The suspension is sucked down upon and through a perforated cylindrical mandrel, laying down a layer in the shape of the mandrel, i.e. a cylinder, which is subsequently dried and the resin cured, after which the cylinder is removed from the mandrel and cut into suitable lengths of filter cartridge. A resin impregnation reduces the porosity of the sheet, which is usually undesirable, and also decreases pore size. The laydown method however does have the advantage that a sheet of considerable thickness can be prepared, according to the strength required to resist high fluid pressure differentials.

Another way of building up a relatively thick cylindrical filter is to cut the sheet into discs, and then stack the discs together, to form a cylindrical element with edgewise flow. In a variation of this method, a cellulose filter sheet material is crimped and wound in a helical or spiral coil about a core to form a cylinder. In each of these cases, however, the cellulose fiber mass is preferably impregnated with a resin, to obtain sufficient regidity and strength.

In all of these variations the filter has a smooth surface, and therefore a relatively small surface area in a small volume. Because of the smooth surface, there is also a drainage problem, if the filter cylinder is supported on an internal or within an external core or sheath. A close-fitting support having alternating open and closed areas will reduce the available surface area of the filter for drainage by the surface area of the imperforate portions.

One way around this difficulty is to form the filter cylinder of a relatively thick sheet, such as from 0.018 to 0.035 inch thick, and then axially groove the sheet to about from approximately ⅛ to ½ the thickness of the sheet, using hot rolls. The grooves provide spaces providing flow of fluid axially in the cylinder, on the downstream side of the filter element.

In order to increase the surface area of the filter sheet available for collection of contaminants, thus extending useful life of the filter, the filter sheet can be corrugated. Because of the relative weakness of paper sheets, however, the corrugations have a strong tendency to collapse, or lay over, arising from the folding together of corrugations in groups, as contaminants collect on the surface of the filter, and differential pressure builds up on the element. Layover of course reduces the available surface area for flow, further reducing the dirt capacity of the filter, and giving a rapid rise in differential pressure across the filter.

In order to minimize layover, paper filter elements must be made with a high resin content, thick paper, deep grooves, and shallow corrugations, all of which tend to build a certain inefficiency into a paper filter cartridge. For a groove to be self-supporting in corrugated form, for instance, in the grooved paper cartridges referred to earlier, and not collapse when wetted and under high differential pressure, the paper must be quite thick, usually about 0.020 inch and more, and the resin content must be very high, usually about 30% or more. This increases the cost of the filter considerably. For example, a typical retentive phenolic epoxy-impregnated paper 0.03 inch thick costs about seven cents per square foot, compared with less than one cent per square foot for high grade laboratorytype filter paper of equal contaminant removal rating.

The relatively large thickness of such paper limits the amount of paper which can be incorporated into a given volume. Besides that, the resin impregnant limits the use of the filter; for example, phenolic resins render the filter element unsuitable for potable water service. Moreover, a high resin content reduces the pore volume of the filter, and lowers the dirt capacity, as compared with non-resin impregnated paper.

In accordance with the instant invention, filter tubes or cartridges are provided comprising a plurality of paper filter sheets of differing pore size, arranged in sequence of fluid flow therethrough according to decreasing pore size, formed in a concentric corrugated tubular configuration for fluid flow therethrough across the tube from one side to the other side, with at least one foraminous relatively rigid support and drainage member in corrugated supporting juxtaposition to the filter tube.

The support and drainage member provides a sufficient rigidity to the paper filter sheets in the tubes of the invention to avoid the necessity of resin-impregnation of the paper filter sheets, and also makes it possible to use rather thin paper sheets, less than about 0.02 inch thick, and preferably from about 0.002 to about 0.012 inch thick, and having a density below about 0.075 g/cc, and usually about 0.1 to about 0.6 g/cc, preferably from about 0.2 to about 0.5 g/cc. The use of corrugated paper filter sheets provides a greater surface area, and hence a higher dirt capacity, within a given volume. Adequate rigidity is obtained to prevent layover. By using appropriate layers, graded from coarse to fine, in sequence of fluid flow, the contaminants are screened out according to size, and filter tubes with a higher dirt capacity and a longer surface life, as well as a better removal rating, and a higher efficiency, can be provided.

Filter cartridges can be provided using two, three, or more layers of paper filter sheets within a small volume. Filter elements of a size and volume no greater than or equal to conventional grooved or corrugated and resin-impregnated filter elements can in fact be made using two, three, or more layers of filter paper sheets, with consequently a higher dirt capacity, and a better removal rating, without use of any resin impregnation whatsoever. A typical thickness per layer is 0.005 to 0.008 inch. thus, three layers occupy no more space than a single layer of resin-impregnated paper. Since the paper filter sheet contains little or no binder resin, and can, in fact, be all of cellulosic fiber material, the filter cartridges in accordance with the invention can be used with food products, medicaments, pharmaceuticals, blood, and other sensitive fluid materials.

The paper filter sheets employed in the filter tubes in accordance with the invention can be made of any kind of paper fiber. Paper filter sheets are now made using a variety of fibers, of which cellulosic fibers are of course the most important, and the most commonly available. Cellulosic fibers made from any lignocellulosic material can be used, including cellulose fibers from wood, cellulose fibers from cotton, and cellulose fibers from hemp. Hemp fibers are stronger, and relatively long and rigid, and hence make very open and strong papers. Esparto fibers make a very retentive paper. Regenerated cellulose fibers such as viscose rayon can also be used.

Fibers of synthetic resinous material or cellulose derivatives also can be used, such as cellulose acetate, cellulose acetate propionate, cellulose acetate butyrate, and ethyl cellulose, as well as polyamides, polyesters, polyacrylonitrile, polyvinyl chloride, copolymers of vinyl chloride and vinylidene chloride, polypropylene, polyethylene, and polybutylene. Inorganic materials, such as potassium polytitanate, glass, and ceramic fibers also can be used. Metal filaments also can be used, such as stainless steel, aluminum, copper and brass.

It is quite important to maintain a high degree of openness in the paper sheet and accordingly the density of the sheet is below that normal for a filter paper sheet. The density is less than 0.75 g/cc, usually within the range from about 0.1 to about 0.6 g/cc, and preferably from about 0.2 to about 0.5 g/cc.

The thickness of the sheet also influences openness, and is less than 0.02 inch and within the range from about 0.001 to about 0.02 inch, preferably from about 0.002 to about 0.012 inch.

Most paper filter sheets are prepared by laydown of the desired fibrous material on a Fourdrinier wire or foraminous sheet. Air-laid paper filter sheets and melt-spun and bonded paper filter sheets also can be used. Nonwoven paper sheets are non-woven masses of fibers held together by interlocking of the fibers in the layer. If desired, bonding of the fibers of the paper sheet can be achieved, where the fibers are of cellulosic material, by application of from about 0.01 to about 10% of a cellulosic material binder such as a cellulose xanthate, or viscose, which is subsequently converted to cellulose. The resulting paper filter sheet is entirely of cellulosic material.

Cellulosic filter paper sheets can be used with no binder, but with a small quantity of wet-strength resin, such as melamine-formaldehyde, in an amount typically from about 0.2 to about 0.5%, but never more than from about 0.01 to about 10%. Such papers have low rigidity, as contrasted with typical resin-bonded papers.

The foraminous relatively rigid support and drainage members have a rigidity that is higher than paper, and sufficient strength to withstand encountered differential fluid pressures across the filter tube. The preferred foraminous sheets are made of filamentary synthetic resinous material.

Suitable foraminous external and interior supports can be made of metal or plastic, and can be, for example, in the form of perforated sheets or plates, or woven or nonwoven or extruded netting, made of plastic filaments or extrusions. Any thermoplastic synthetic resinous material can be employed, such as polyethylene, polypropylene, polybutylene, polystyrene, polyamide, cellulose acetate, ethyl cellulose, cellulose acetate butyrate, copolymers of vinyl chloride and vinyl chloride and vinyl acetate, polyvinyl chloride, polyvinylidene chloride, vinylidene chloridevinyl chloride copolymers, polyvinyl butyral, polytrifluorochloroethylene, polymethyl methacrylate, and synthetic rubbers.

Extruded plastic netting is available in a variety of patterns. In some, the plastic has an open weave pattern, with the extruded netting links in one direction having the same diameter as the exruded links in the other. Others have the extruded links wider in one direction than in another, forming ribs extending lengthwise, or crosswise, or circumferentially, of the netting. Netting generally is preferred in which the extruded links are of uniform diameter, or, if one is of larger diameter than the other, the larger diameter extrusions run circumferentially of the netting, so as to minimize blockage of the convolutions or corrugations filter element. Extruded nettings also are available having diagonal patterns with the openings tetragonal, and in others cross-diagonals are bisected by longitudinal extrusions forming triangular openings. Any of these can be used.

Nonwoven materials, called "spun-bonded", can be prepared by laydown of extruded theremoplastic synthetic resin filaments while still soft in the form of a nonwoven mat. The soft fibers adhere to one another, and when cooled form an integral mass of nonwoven filamentary structure. This technique is applicable to glass fibers, to polyamides, and to other thermoplastic fibers.

Nettings also are formed from extruded thermoplastic resin sheet, which is embossed during or after extrusion and then stretched to open holes in the embossed areas, resulting in the formation of a netting in sheet form.

Perforated sheet also can be used. In this case elongated perforations can be punched or machined in the sheet or formed by application of heat localized to the areas to be perforated.

Spun-bonded nonwovens can also be prepared by laying down two types of fibers as a nonwoven mat, one fiber being lower melting and present in small proportion. When the web is heated to above the softening point of the one fiber, it becomes firmly bonded. This technique is applied commercially to polyester fibers.

In order to enclose the filter element in a tight external protective sheath, it is advantageous to employ extruded netting (tubular, in the case of a tubular or cylindrical filter element) having a diameter slightly less than the external diameter of the element. The tubular netting is heat softened and expanded, the filter element inserted, and the tubular netting then allowed to cool and harden, and at the same time shrink to embrace the filter element in a snug fit, providing excellent support and rigidity to the element.

If thermoplastic extruded, woven or nonwoven netting is employed as the external and internal support, thermoplastic material also can be used as the end caps, and for this purpose it is advantageous to form the end caps and the netting of the same plastic material. Polypropylene and polyethylene are preferred, because of their inertness and durability, as well as high tensile strength and rigidity, but many other thermoplastic materials are suitable.

Two or more filter sheets placed in contact with each other are advantageous because occasional random defects may be present in the sheets. By placing two sheets face to face, the probability of two defects being superimposed on each other becomes remotely small.

Support and drainage members such as cover sheets can then be put on one or both sides of the composite. The composite is then corrugated, to the desired number and depth of corrugations, formed into a tubular configuration, in a manner such that the pore size of the juxtaposed filter sheets is in decreasing order in the intended direction of fluid flow through the composite, from inside to outside or from outside to inside of the filter tube, and the ends lapped over and bonded together in a side seam seal. In this way, the corrugations of the support and drainage members match the corrugations of the paper filter sheets, and these sheets are in corrugated supporting juxtaposition to the paper filter sheets.

The open ends of the filter cartridge thus obtained are closed off by end caps, of which at least one has an aperture therethrough for access of fluid to the open interior of the filter cartridge.

The end caps can be bonded to the filter element by application of an adhesive, or by application of heat and pressure, or a solvent if the binder in the filter sheet is thermoplastic or solvent-soluble, or if the end caps are thermoplastic, and/or solvent-soluble. A suitable bonding method in the case of thermoplastic end caps is described in U.S. Pat. No. 3,457,339, dated July 22, 1969, to D. B. Pall, et al., the disclosure of which is hereby incorporated by reference. In this procedure, the end cap interior is softened by rapid application of heat, so as to obtain softening before the exterior of the end cap has been softened, to prevent the end cap from being distorted, or lose its shape. Thermoplastic materials that can be used and the termperatures which can be employed in obtaining the bonding are given in the Table at column 6 of the patent.

While it is preferred to form the filter sheet material in the shape of a cylinder, it may also be a cone, which may be frustoconical, or any other type of closed configuration. Thus, polygonal tubular elements are possible. Here too, the filter sheet may be corrugated, or shaped in an undulating style, to increase surface area.

The folded ends of the filter sheet are sealed together in a side seam seal, extending longitudinally of the element, with the ends folded inwardly or outwardly, as desired, and bonded together by an adhesive.

In many cases, it may be desirable to increase the resistance of the filter sheet material to either fluid pressure or back pressure. This can be done by supporting the filter element on the interior by a filter core, and by enclosing the exterior of the filter element within a fornaminous supporting material. The external support can be tubular or cylindrical or conical, according to the filter element, so as to closely abut the filter sheet material throughout its surface area. If the filter element is corrugated, the supporting material can abut the corrugation peaks; it can also be corrugated, if desired, although this is not necessary.

Preferred embodiments of the invention are shown in the drawings, in which.

Figure 1:
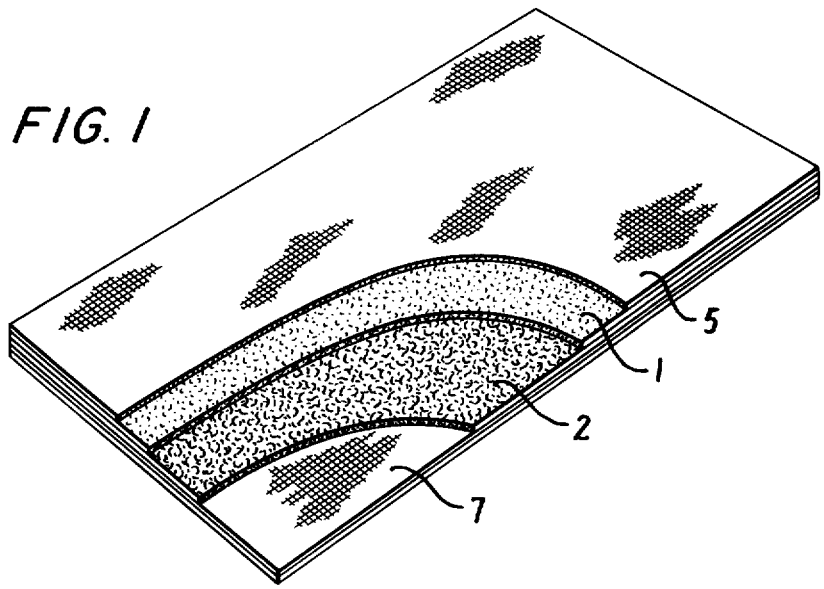
FIG. 1 represents a perspective view, partly in section, with parts cut away, of a composite of a plurality of filter sheets in accordance with the invention, with foramininous support and drainage members on each side of the composite.
Figure 2:
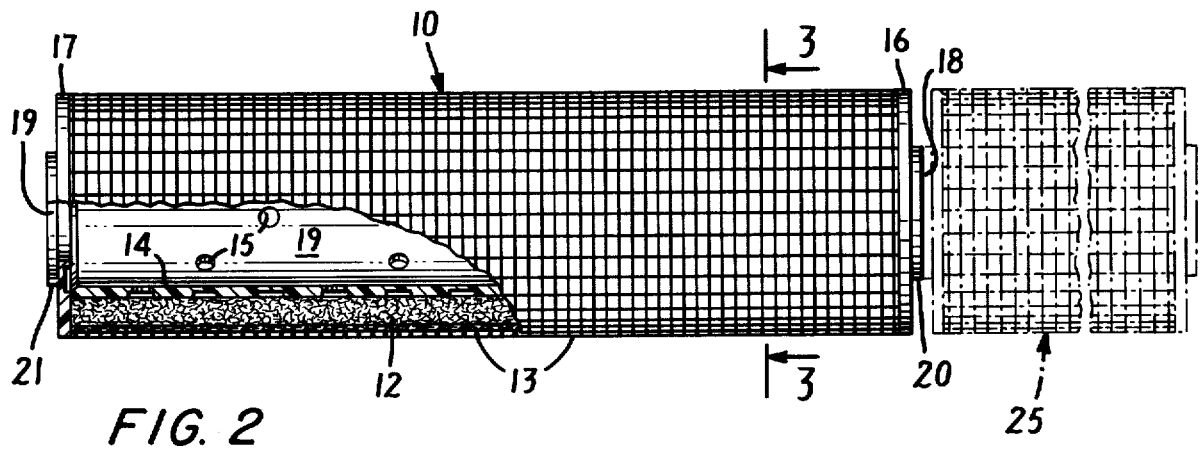
FIG. 2 represents a side view of a filter tube including the composite of FIG. 1.
Figure 3:
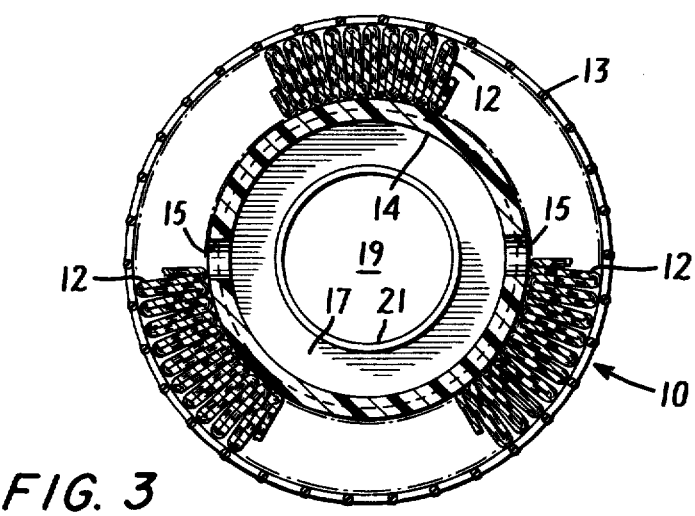
FIG. 3 is a cross-sectional view taken along the line 3—3 of FIG. 2.

The filter element shown in FIGS. 1 to 3 is composed of two filter sheet materials 1, 2 in accordance with Example 1, with the relatively coarser porous paper sheet 2 (Type A) on the outside, and a finer porous paper sheet 1 (Type B) on the inside. The filter sheet materials 1, 2 are sandwiched between inner and outer layers 5, 7 of polypropylene woven netting. The filter sheets are juxtaposed, and in contact, but are not bonded together, although they can be.

The composite four-layered filter element of Example 1 is folded and corrugated to form a cylinder 10, the ends lapped over and sealed, slipped over a foraminous cylindrical core 14 provided with apertures 15 for flow into the open interior of the core, and the ends of the cylinder capped by end caps 16, 17 of polypropylene resin.

The end caps 16, 17 are sealed by fusion to the ends of the filter cylinder 10, closing off the interior from the exterior of the filter element. Fluid flow can thus be from the outside to the interior of the filter element, via sheets 2, 1 in that order, since interior and exterior are completely separated by the filter element, sealed off by the end caps 16, 17. The end caps 16, 17 each have a central aperture 18, 19, and a peripheral flange 20, 21.

The flanges of the end caps are standardized, and provide a sacrificial link to end caps of other similar filters 25, so that filters can be butted together at the flanges and then bonded together by fusion, solventintegration or spin-welding, or by an adhesive, to link filters together.

The following Examples in the opinion of the inventor represent preferred embodiments of the invention.

EXAMPLE 1

A low density regenerated cellulose bonded hemp fiber sheet, designated as Type A, and having the following properties was prepared on a Fourdrinier wire:

| | |
|---|---|
| Basis weight | 4.5 g per sq. ft. |
| Thickness | 0.009 inch |
| Density, g/cc | 0.21 |

Liquid displacement and glass bend penetration methods were used to measure pore size, which was determined to be:

| | |
|---|---|
| Average pore size | 40 μM |
| Maximum particle passed | 90 μM |

A second hemp fiber sheet, Type B, was prepared in a manner similar to the above, but at a higher density:

| | |
|---|---|
| Basis weight | 4.5 g per sq. ft. |
| Thickness | 0.007 inch |
| Density, g/cc | 0.27 inch | and the pore size was determined to be:

| | |
|---|---|
| Average | 28 μM |

| | |
|---|---|
| Maximum particle passed | 65 μM |

The two sheets were then cut to 9 ½ inches wide, and assembled with a layer of 18 × 14 × 0.009 inch polypropylene woven mesh on either side. The composite was corrugated with 85 corrugations, each 0.45 inch deep, and assembled with a core and melt bonded to polypropylene end caps in the manner described in U.S. Pat. No. 3,457,339, as shown in FIGS. 1 to 3.

The arrangement of the composite placed the Type A sheet outermost and the Type B sheet innermost, so that flow was from out to in, and through the coarser layer first.

The resulting filter element had the following characteristics:

| | |
|---|---|
| Maximum particle passed | 55 μM |
| Dirt capacity to 50 psid as determined by passing a suspension of AC fine test dust in water at 10 liters/minute: | 185 g. |

These properties represent a substantial improvement over those of a conventional resin-impregnated grooved paper element of equal surface area, which showed:

| | |
|---|---|
| Maximum particle passed | 80 μM |
| Dirt capacity | 155 grams |

EXAMPLE 2

Air-laid regenerated cellulose-bonded wood fiber sheets were prepared with the properties listed under Types C and D in the tabulation below. A third sheet, listed as Type E, was made by wet Fourdrinier methods, using mixed wood and cotton fibers with 2% of a melamineformaldehyde wet-strength resin.

| Type | Basis weight (g/sq. ft.) | Thickness (inch) | Density (g/cc) | Average pore size (μM) | Maximum particle passed (μM) |
|---|---|---|---|---|---|
| C | 4.6 | 0.007 | 0.28 | 32 | 125 |
| D | 4.7 | 0.006 | 0.32 | 21 | 70 |
| E | 6.0 | 0.008 | 0.31 | 16 | 26 |

The three sheets were assembled between two sheets of polypropylene netting on the inner and outer surfaces, corrugated, and then formed into a cylinder with a side seam seal, and the open ends capped off with polypropylene end caps, as in Example 1.

The resulting filter element had the following characteristics:

| | |
|---|---|
| Maximum particle passed | 20 μM |
| Dirt capacity to 50 psid | 85 grams |

These properties should be compared with those of a conventional resin impregnated element of the same surface area:

| | |
|---|---|
| Maximum particle passed | 28 μM |
| Dirt capacity to 50 psid | 62 grams |

EXAMPLE 3

An element was prepared exactly as Example 2, except that the Type E layer was replaced by a Type F layer, with the following characteristics:

| | |
|---|---|
| Basis weight, g/sq. ft. | 7.0 |
| Thickness, inch | 0.007 |
| Density, g/cc. | 0.42 |
| Average pore size, μM | 8 |
| Maximum particle passed, μM | 14 |

The three sheets were assembled between two sheets of polypropylene netting on the two outer surfaces, corrugated, and then formed into a cylinder with a side seam seal, and the open ends capped off with polypropylene end caps, as in Example 1.

The resulting filter element had the following characteristics:

| | |
|---|---|
| Maximum particle passed | 10 μM |
| Dirt capacity to 50 psid | 47 grams |

These characteristics should be compared with those of an equal area, conventional cellulose fiber single layer grooved element, with an approximately equal total thickness of filter medium:

| | |
|---|---|
| Maximum particle passed | 17 μM |
| Dirt capacity to 50 psid | 38 grams |

EXAMPLE 4

An element was made similar to Examples 2 and 3, except that the three paper layers were:

| | Thickness (inch) | Density g/cc | Maximum particle passed, μM |
|---|---|---|---|
| Type C | 0.007 | 0.28 | 125 |
| Type E | 0.008 | 0.31 | 26 |
| Type F | 0.007 | 0.42 | 14 |

The resulting element had a maximum particle passed rating of 9 microns, and a dirt capacity 38 grams, which is superior to conventional single-layer grooved elements of the same surface area.

EXAMPLE 5

A multilayer filter medium was made on a Fourdrinier wire using multiple head boxes, as follows:

Three lots of cellulose fiber suspensions were prepared, and the type of fiber and degree of beating adjusted so as to obtain hand sheets having properties equal to those of Types B, E, and F of the preceding Examples. These suspensions were then laid down on the Fourdrinier wire, with each layer successively deposited in the other, the sequence being B-E-F. The resultant cellulose fiber sheet was 0.022 inch thick, and showed a maximum particle passed of 9 μM.

A corrugated element was made by corrugating this sheet with a layer of 18 × 14 × 0.009 inch polypropylene mesh on either side. The resulting element had characteristics indistinguishable from those of Example 4.

Having regard to the foregoing disclosure, the following is claimed as the inventive and patentable embodiments thereof.

1. A tubular filter cartridge comprising a tube having open ends closed off by end caps, with at least one of the end caps provided with at least one aperture for fluid flow therethrough into the interior of the tube, the tube comprising a plurality of separate unattached juxtaposed paper filter sheets of differing pore size, arranged in sequence of fluid flow therethrough according to decreasing pore size, and formed in a concentric corrugated tubular configuration, for fluid flow through the tube from one side to the other side, the separtate paper filter sheets comprising cellulose fibers exclusively, substantially free from binder, being from about 0.001 to about 0.02 inch thick, and having a density within the range from about 0.1 to about 0.75 g per cc, with at least one foraminous corrugated relatively rigid separate unattached support member in supporting juxtaposition to at least one of the outermost and innermost sheets of the tube.

2. A filter cartridge according to claim 1, in which the support member is of lastic filamentary netting.

3. A filter cartridge according to claim 1, in which the support member is of a wire mesh.

4. A filter cartridge according to claim 1, in which the paper filter sheets comprise fibers of cellulosic material derived from wood.

5. A filter cartridge according to claim 1, in which the paper filter sheets comprise fibers of cellulosic material derived from cotton.

6. A filter cartridge according to claim 1, in which the paper filter sheets have a density within the range from about 0.1 to about 0.6 g/cc.

7. A filter cartridge according to claim 1, in which the paper filter sheets have a density within the range from about 0.2 to about 0.5 g/cc.

8. A filter cartridge according to claim 1, in which the paper filter sheets have thickness within the range from about 0.002 to about 0.012 inch.

* * * * *